(12) United States Patent
Romeo (10) Patent No.: US 8,841,794 B2
(45) Date of Patent: Sep. 23, 2014

(54) WIND TURBINE WITH COMPENSATED MOTOR TORQUE

(75) Inventor: Manuel Lahuerta Romeo, Zaragoza (ES)

(73) Assignee: Tempero 2000 S.L. (ES)

( * ) Notice: Subject to any disclaimer, the term of this patent is extended or adjusted under 35 U.S.C. 154(b) by 252 days.

(21) Appl. No.: 13/319,528

(22) PCT Filed: Jun. 30, 2009

(86) PCT No.: PCT/ES2009/000348
§ 371 (c)(1),
(2), (4) Date: Jan. 30, 2012

(87) PCT Pub. No.: WO2011/000975
PCT Pub. Date: Jan. 6, 2011

(65) Prior Publication Data
US 2012/0133148 A1    May 31, 2012

(51) Int. Cl.
*F03D 11/02* (2006.01)
*F03D 1/06* (2006.01)
*F03D 7/02* (2006.01)

(52) U.S. Cl.
CPC ............. *F03D 1/0608* (2013.01); *Y02E 10/723* (2013.01); *Y02E 10/721* (2013.01); *F05B 2270/1014* (2013.01); *Y02E 10/726* (2013.01); *F05B 2270/508* (2013.01); *F05B 2270/1095* (2013.01); *Y02E 10/722* (2013.01); *F03D 7/02* (2013.01); *F03D 11/02* (2013.01); *F05B 2270/402* (2013.01); *F05B 2260/421* (2013.01)
USPC ........................................................ 290/55

(58) Field of Classification Search
USPC .................................................. 290/44, 55
See application file for complete search history.

(56) References Cited

U.S. PATENT DOCUMENTS

| 4,863,350 | A  | * | 9/1989 | Quarterman | ............... | 416/193 R |
| 8,277,184 | B2 | * | 10/2012 | Nies et al. | ......................... | 416/9 |
| 2004/0120801 | A1 | * | 6/2004 | Antoune et al. | ............... | 415/4.2 |

FOREIGN PATENT DOCUMENTS

| EP | 0009767 | 4/1980 |
| ES | 2179785 | 1/2003 |
| WO | WO 0319005 | 3/2003 |

OTHER PUBLICATIONS

International Search Report for PCT application PCT/ES2009/000348, Mar. 24, 2010, Madrid, Spain.

* cited by examiner

*Primary Examiner* — Tulsidas C Patel
*Assistant Examiner* — Sean Gugger
(74) *Attorney, Agent, or Firm* — Bourque and Associates, PA (57) ABSTRACT

COMPENSATED MOTOR TORQUE WIND TURBINE, constituted by a single blade (12) rotor (1) attached to a low speed shaft (3) with spindle (2) sustained in a nacelle (9), on gear bearing (7), at the end of the tower (8), being the power train elements: multiplier (5), generator (6) and brake (13) suspended from the nacelle (9) through a first bearing (4) aligned with the low speed shaft (3), forming a pendulum set (28) that allows them to rotate, compensating in its angular motion the rotor (1) torque, said pendulum set (28) accumulates potential energy when rising in its angular motion and releases it when the gust stops by descending and turning in the opposite direction of the rotation of the turbine's rotor (1) restituting turns to the generator's (6) rotor, being this effect a power regulator.

9 Claims, 8 Drawing Sheets

WIND TURBINE WITH COMPENSATED MOTOR TORQUE

OBJECT OF THE INVENTION

The invention, as expressed in the title of this specification, refers to a compensated motor torque wind turbine.

More particularly, the object of the invention focuses on a motor torque wind turbine which is compensated thanks to incorporating an inertial pendulum, so that its structural innovative design makes it able to capture the wind energy with less effort than traditional machines, providing more uniform and quality energy by incorporating passive mechanical systems that compensate for, accumulate and restore the power peaks and valleys caused by the wind gusts as well as instant charge variations in isolated parts of the electrical grid.

This makes it a more compatible turbine with the electrical grid, able to work while connected to weak grids, as it is a more tolerant machine, causing less disruption on the grid.

Also, it is advantageously suitable to work in parallel with other energy sources when satisfying the energy demands in isolated places.

Basically, the new turbine has the particularity that it places the elements of the power train (generator, brake disc and multiplier) in a pendulum, that is, suspended from a bearing aligned with the rotor shaft so that it allows them to rotate until balancing, in its movement, the rotor torque, releasing the nacelle, the tower and the shoe brake from this effort, being said principle equally applicable to other motor machines, such as aircraft and single propeller ships.

Optionally, the compensated motor torque wind turbine, in one embodiment for isolated applications or where the quality of supply needs to be improved, is modified and supplemented by a set (kit) that improves the stability and quality of the energy supply.

This modification consists of inserting hydrostatic transmission between the multiplier and the generator, so that the generator, in through shaft version, is located on a large flywheel, both arranged at the base of the tower and activated by a variable cylinder capacity hydraulic servomotor, through a hydraulic coupler.

On the multiplier and in place of the generator, a hydraulic station with its pump, filters and control accessories, is mounted.

This solution allows direct use of synchronous generators to get the kind of generation (active or reactive) wanted, giving the rotor the possibility of working at constant Lambda (λ) keeping the generator at constant revolutions with the tolerance that the grid frequency allows.

When using eolic pumping or desalination by reverse osmosis, the generator, located at the base of the tower, is replaced by a pump that, joined to the flywheel, will produce the energizing of the fluid in a more stable manner.

Besides, by its low cost and maintenance, derived from its simplicity, the proposed turbine may be profitable in less wind potential sites, thereby increasing its expansion.

On the other hand, as it is a less overloaded structure, the turbine of the invention is also appropriate to replace old turbines, allowing making use of the tower, shoe and electrical infrastructure by increasing the areas swept by the rotor and get more equivalent hours in the same location.

FIELD OF THE INVENTION

The field of the present invention falls within the industry sector dedicated to the design, manufacture and installation of wind turbines, applied to network generation, isolated generation, wind pumping and inverse osmosis desalination.

BACKGROUND OF THE INVENTION

As it is known, wind is an energy that has been used since old times, especially as an aid to navigation. Currently, modern wind turbines transform this energy in electricity pouring it to the grid. However, its lack of continuity, particularly its lack of uniformity regarding intensity and direction, cause unfavorable conditions for both the turbines itself and for the stability of the electrical system to which they connect, whose main feature must be providing continuity in the supply and tension and frequency consistency.

Thus, as the wind occurs most of the time as short duration gusts, these, by intercepting the wind turbine rotor, produce stress that affect both the wearing of the turbine and the quantity and quality of energy generated.

In this sense, it is important to remember that any variation of the wind speed affects:

a) The thrust (trust) on the turbine, which is proportional to the area swept by the rotor and the square of the wind speed.

b) The torque (torque) of the turbine which is proportional to the area swept by the rotor and the square of the wind speed.

c) The rotor's rotation speed which in turbines with variable rotor speed is directly proportional to the wind's speed.

Thus, thrust, torque and rotational speed of the turbine and hence its captured power, are affected with any variation of sweep area and wind speed.

These variations generate loads that are supported by the structure of the turbine itself, through its mechanical components, and transmitted to the ground trough the shoe.

When changes are in the direction of the wind, force torques result from misalignment of the axial thrust, which must be supported, in the classic machines (windward three bladed-Danish model), by a set of brakes and pinion gear motors attacking on the gear box that strain and overload the whole structure and its mechanical components, until reaching the ground through the shoe. All this for not being self-steering geared turbines.

The current wind machine technology, whose design is based on the Danish model (windward three-bladed) solves these problems sizing the structures for these loads and handling the machines with active regulation and control servo systems, capable of dealing with the natural elements up to the limits of safety advice economy bearing.

In the current state of the art, the existence of two families of turbines, horizontal axis and vertical axis, is known. Within the first ones, which are the ones that may concern us, a first classification between those that have the rotor to windward and the ones that have it placed to leeward of the tower, could be done.

Windward models are, in general, known as Danish model, that is, triple bladed that incorporate generators of various technologies with or without speed multipliers solidly attached to a nacelle governed by active guiding systems.

Leeward models are usually double bladed or single bladed that use faster rotors than the previous ones with active or passive guidance systems.

In all known cases, the torque of the rotor is supported by the mechanical elements that make up the power train and is transferred to the structure of the nacelle to the tower, shoe and ground. The rigidity, with which any variation of the torque is transmitted to the power train components up to the generator, causes power peaks that tend to destabilize the network and strain the turbine components.

Regarding the variation of the swept area and its influence on the technical parameters of the machine, we will say that no known manufacturer uses this concept as the power regulator, as they all offer constant swept areas (affected only by bending of the blades) unlike the present patent that considers the area swept by the rotor as a control variable of power peaks and/or valleys and attenuation of thrust.

Thus, one of the main objectives of the present invention is to eliminate the described rigidities through systems that can compensate, accumulate and restore those variations, preventing these from affecting the uniformity of rotation of the generator, attenuating as a result, the power peaks and structural overloads.

To build a machine that strains less, designing it through mechanisms that provide it with greater degrees of freedom, so that the own wind forces that afflict it, would serve to protect it, accommodating to new working positions in equilibrium (passive systems) is the philosophy of the design object of the present invention, noting that the applicant does not have knowledge of the existence of any other invention that presents similar technical, structural and configuration features.

EXPLANATION OF THE INVENTION

Thus, the compensated motor torque wind turbine which the present invention recommends, is shaped itself as a remarkable novelty within its field of application, as it successfully reaches the objectives previously identified, which characterizing, technical, structural and configuration details are fully exposed below, also being properly included in the appended claims accompanying the present specification.

Thus, in all mechanical design the aim is for the structures comprising it to be balanced, either regarding their supports or, if they rotate, regarding their rotation axis. Masses that form their components can, depending on their location, balance or counterbalance. Joints among components can be rigid or with certain degrees of freedom. The first ones, before a perturbation, they stress, while the second ones, before a perturbation, they accommodate changing position, preventing stress.

Therefore, the result of placing the masses of some turbine components (generator, brake disk multiplier) in a pendulum, suspended from a bearing aligned with the axis of the rotor, allowing them to rotate until balancing the rotor's torque, releasing the nacelle, tower and shoe from this effort, is one of the mechanical principles of the turbine object of the present invention, being said principle, as mentioned above, also applicable to motor machines such as aircrafts and single propeller ships.

Notwithstanding the foregoing, all the components that form the power train have within themselves or in their interior elements that are spinning at different speeds and that accumulate much higher rotation kinetic energies than those of the pendulum set. Understanding as inertia the property of a body to oppose any change in position, rotation speed or movement, we may say that when the sum of the inertia of the rotating parts of the various elements that form the power train (axle and gears and/or pulleys, brake disc, and generator rotor) exceeds the inertia of the pendulum itself (multiplier, brake disc, generator) the one with less inertia, that is, the pendulum, will react to any perturbation of the torque, the rotating masses affecting the one with greater inertia less.

To improve this effect, the brake disc will be placed at the high speed shaft and accompanied by a flywheel sized in function with each application to provide the running stability desired.

This is another objective pursued by the present invention, that is, any perturbation of the torque would be absorbed mostly by the pendulum set with almost no effect in the uniformity of the generator's rotation. This aspect is closely linked to the quality of electricity generated.

On the other hand, the pendulum will not only balance the torque, but it will accumulate potential energy in its motion when rising and it transfers it when falling. Therefore, it will behave as a regulator that will tend to standardize the amount of energy injected to the grid, mitigating the peaks and smoothing the power valleys.

When the torque increases due to a gust of wind, the pendulum, as it has less inertia, will react rising immediately, rotating in the same direction as the turbine rotor, therefore with no significant relative motion between both of them, to a new position of equilibrium, without appreciably affecting the uniformity of rotation of the generator's rotor.

On the contrary, when the gust stops as the torque falls, the pendulum descends to occupy a new position of equilibrium, in its descent it will go in opposite direction to the rotation of the turbine and will restore the generator's rotor potential energy by returning a number of turns in function of the gear ratio, which is fixed, between rotor and generator.

If the gear ratio was, for example 1/32 it would mean that when the pendulum makes a ¼ turn (90°) the generator's rotor shaft would have turned 32/4=8 revolutions. Thus, the pendulum restores in its descent, in the form of revolutions of the generator, the energy accumulated in its motion.

Therefore, on machines designed under the present invention, when this effect wants to be maximized, there will be a tendency to seek high gear ratios between rotor and generator, a feature that occurs in high power machines due to the large rotor's diameter.

In summary, any disturbance (gust) resulting in an increase in the torque, will be used in:

a) Accelerating the rotor and the slow shaft increasing its kinetic energy.

b) Increase the kinetic-potential energy of the pendulum raising it to a whole new balance position.

c) Increase the kinetic energy of the rotating masses forming the power train, including the generator's rotor, brake disc and flywheel.

These increments being divided in an inversely proportional way to their respective inertia.

On the other hand, to compensate the torque large pendulum masses, or large pendulum arms will be needed, both the first and the second involve high costs and other problems. The most interesting thing is to go for designs that are based on fast rotors, to capture the power at low drive torque (Single bladed or two-bladed) and try, with its own weights (generator, brake disc and multiplier) conveniently located, to achieve to balance said torque. These weights will be supplemented by a flywheel, which in our design may be located in the fast shaft of the multiplier, inside or outside of it, thus increasing the inertia of the rotating parts and acting as a counterweight.

As discussed in the previous paragraph, the power captured by a wind turbine is a function of the area swept by the rotor, being another important objective of the present invention to achieve changing the rotor's swept area before any increase or decrease of the wind speed, compensating for the peaks or valleys of the shaft thrust and therefore, the captured power.

As the swept area is a function of the dihedral angle sine, in our case this is projected close to 155° in terms of nominal power. From this angle any increase or decrease caused by the shaft thrust will significantly modify the swept area and will serve as the first compensator for the power peaks or valleys.

This is achieved as the rotor is designed as an oscillating rotor which adapts its dihedral angle until finding the dynamic equilibrium caused, on the one hand, by the destabilizing moment created by the shaft thrust and on the other hand, by the stabilizing moment created by the misalignment of the centrifugal forces of the blade and the counterweight. This floating motion of the blade is the first gust absorber. When the gust comes, the dihedral angle becomes smaller by decreasing the area, when the gust stops, the dihedral becomes bigger by increasing the area, and this phenomenon of absorption improves the stability of power.

In our design, the absorption is done by elastomers located in the rotor's fork, which when compressed allow variations of ±10° of the dihedral.

As it is a design to leeward, the tower blade should be properly distanced to avoid the shadow effect arising from the trail of the tower. In our design this is achieved by properly sizing the length of the spindle. As the width profile of the trail for a circular tower is more reduced for certain Reynold numbers ($Re<10^3$ preferred or $Re>5*10^5$) we will look for more suitable diameters to minimize the trail effect in the range of wind speeds of the machine operation.

On the other hand, the rotor that is best suited for the desired conditions of low torque is the single bladed, which also presents other clear advantages like describing a dihedral angle of rotation in its motion, which tends to distance itself from the tower in function of the radius, thus encouraging, a distancing from the tower that minimizes the trail effect. In our design we intend, for the reasons already explained, for the angle of the blade with the vertical plane to be close to 155° in nominal power conditions, which moves the blade even further away from the tower.

It should be noted that the rotor in the single bladed version is counterweighted for both its static and dynamic equilibrium. In turn, the distribution of masses along the blade, as well as the placement of the counterweight is the subject of a detailed study to achieve the desired rotation dynamic equilibrium angle that is intended. The blade and counterweight are joined through the hub to the rotor's fork with an oscillating tie, formed by fork and a cardan joint which can transmit the torque and axial thrust for each equilibrium angle giving the set a degree of freedom that avoids pitching moments associated with different incident wind speeds when the blade moves at different ground heights. In our design, the joint is integrated on the outer ring of a bearing housing a worm screw whose carved crown gives shape to the inner ring of said bearing where the rotor hub flanges.

The hub serves as a link between the blade and the counterweight. In our design, the blade is attached to the hub by an elliptical flange and the counterweight, usually of molten lead, is joined by a cylindrical flange of smaller diameter, as the hub has a tapered shape. The hub is connected in its center to the mobile ring of the joint crossing it through the outer flange. Counterweight, hub and blade form the rotor.

The power control will be held by the step change of the blade through a worm screw which, located on the joint, acts on the carved crown in the bearing inner ring, to which the rotor is flanged. Its position is controlled by encoder. This mechanism will also serve as an aerodynamic brake, putting the blade in flag.

Another desired effect in these rotors is the elimination of alternating stress in the blades. By an appropriate rotation speed and a correct mass distribution, which places the center of gravity of the blade where desired (close to 50% of its length) we will achieve that for any rotation angle, the centrifugal forces will dominate over the bending ones, so that the dominant effort will be the traction, in order to eliminate the sign change caused by the bending component, thus contributing to all the blade area supporting the stress. The single bladed rotor as it is faster supports this effect.

Being a single bladed, it will have a low starting torque in the turbine, therefore, in the case of an application on an island, it will have a set of batteries to start up the turbine. And in case of connecting to the grid the start will occur by absorbing energy from it according to a controlled acceleration ramp.

The turbine's nacelle is a clearly differentiating element with respect to the classic wind turbines. Formed by two halves directly welded, like a lentil-shaped it has an aerodynamic shape to minimize the force of the wind and its trail will not negatively affect the rotor's performance. Within the space occupied by the two halves, hydraulic components, control and geared motor cabinets responsible for guiding the turbine, are housed. Unlike in all known machines, in our design, multiplier, brake disc and generator are not inside the nacelle.

From the nacelle and forming part of itself, a crank arm is placed, whose end holds a spindle, crossed by the slow shaft, that will align the rotor with the pendulum set that forms the power train, through two bearings, one will be the rotor bearing, located to leeward of the spindle and another bearing that holds the pendulum located windward of the spindle.

For orientation with the machine stopped, the turbine of the invention provides for having a reversible execution geared motor brake that engaged through a pinion, on the bearing inner ring that holds the nacelle, governs the position of it until the machine connects to the grid. Once the machine is connected, the motor brake is unblocked releasing the set of the nacelle, as it is a self geared turbine. This gear motorbrake, is used to unwind, when necessary, the cables that form the loop inside the tower, or to position the nacelle where desired, for example in maintenance operations.

Statically balancing, with respect to the gear shaft, the whole nacelle is desirable to achieve a correct self gearing of the machine. The guarantee of the self gearing when running is complete, since the gear force (the shaft thrust) is applied, in leeward execution, far from the gear shaft, as it is applied in the bisector of the dihedral covering the rotor, which ensures stability in motion.

In the design of the pendulum set, a multiplier of parallel shafts of extra long execution has been sought to allow for the center of gravity of the pendulum to be distanced enough so that, in its angular motion and with the generator and wheel masses, it can compensate the torque at 55° and thus achieve the desired effect. The unique design of the multiplier of parallel shafts in an extra long execution is based in a design in two stages, the first one of the low speed shaft formed by an epicyclical train and the second one, the high speed shaft, with chain transmission to achieve the desired distance between shafts. In the high speed shaft of the multiplier and within itself, lies a flywheel which in addition to counterbalancing will give the set great running stability and thus ensure that the inertia of the rotating parts far outweigh the inertia of the pendulum itself. The rest of it, up to 90° degrees, remains as a safety reserve for emergency braking.

In our design, the length of the spindle has received special attention as it important, on the one hand, to separate the blade to minimize the shadow effect of the tower, and on the other hand, to approximate the center of gravity of the pendulum to the gear shaft of the tower to prevent that unwanted gyroscopic gearing effects would generate during its motion.

In the hydrostatic transmission option, the generator is separated from the pendulum to be mounted in dual shaft execution on a large flywheel, located at the base of the tower at ground level. In the place where the generator was located in the pendulum, an oil hydraulic central that will push pressured oil to a servo drive variable cylinder engine, will be mounted, its conducts going through a rotating connector located in the nacelle, which will allow the turbine to orientate without twisting the hydraulic conducts. The return of hydraulic fluid will go back to the central through a second rotating connector.

The flexibility that the oil hydraulic servomotor gives will allow adjusting, at all times, its engine cylinder to provide variable torque at constant revolutions, a condition required by the large inertia of the flywheel that will refuse to vary its speed. Flywheel and generator rotor will rotate in a stable and steady manner, allowing the turbine rotor to accelerate and decelerate for work at λ (Lambda) constant, which improves its performance (the rotor's). Because these are generators that can be synchronous (sources) it will allow adjusting the cost to generate the desired quality of energy.

In the case of isolated applications with on demand generation, the large inertia accumulated on the flywheel will allow us to have the necessary time to adjust the propeller pitch (pitch) and easily capture the demanded power without the need of using electronic power, or dissipating resistances of the excess energy.

In order for the turbine rotor to start easily, a torque hydraulic coupler is installed between the oil hydraulic servomotor shaft and the generator shaft. In the case of pumping or desalination by reverse osmosis, instead of the generator, a pump attached to the flywheel will be installed, causing a more uniform flow which will avoid the formation of water hammer. If it was pumped from deep wells, the pump would go submerged in depth and its shaft operated through the flywheel, by cardan transmission. For this, the tower will be installed directly over the well.

The described compensated motor torque wind turbine thus represents an innovative solution with features and performance unknown to this date, reasons that along with its practical use, gives enough foundation to obtain the privilege of exclusivity requested herein.

DESCRIPTION OF THE DRAWINGS

To complement the description being made and in order to help better understand the features of the invention, a set of drawings is attached to the present specification as an integral part of itself, wherein the following is shown as way of illustration but not limited to.

PREFERRED EMBODIMENT OF THE INVENTION

Figure 1:
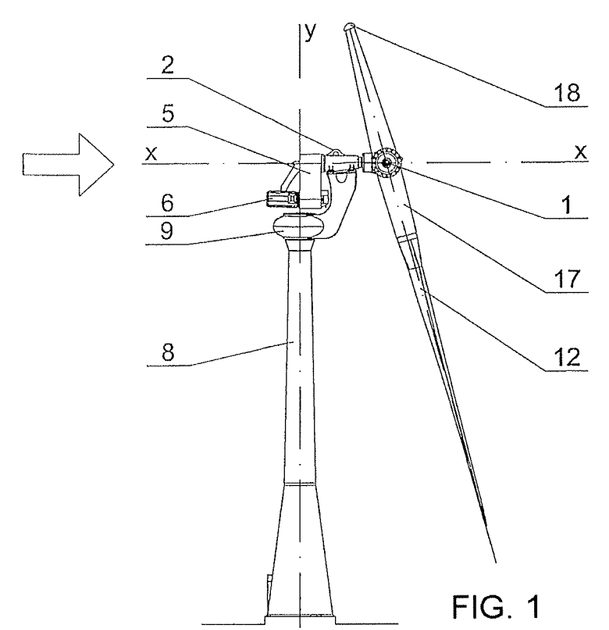
FIG. 1.—Shows a schematic side elevation view of the compensated motor torque wind turbine, object of the invention, in a preferred embodiment of a leeward single bladed execution, showing the main parts and elements of which is made up.

In view of the aforementioned figures, and according to the numeration adopted, an example of a preferred embodiment of the invention is shown as well as an alternative variant thereof, which comprises the parts and elements that are detailed and described below, having used the following numerical references to designate them in the figures:

1. rotor
2. spindle
3. low speed shaft
4. first bearing (pendulum set)
5. multiplier
6. generator
7. gear bearing
8. tower
9. nacelle
10. elastomers
11. flywheel
12. blade
13. brake disc
14. gear motor-brake
15. crank arm
16. fork
17. hub
18. counterweight
19. joint
20. worm screw
21. mobile ring
22. second flywheel
23. oil hydraulic servomotor
24. hydraulic coupler
25. oil hydraulic central
26. rotating connector
27. pump
28. pendulum set
29. high speed shaft Thus, as shown in said figures, the compensated motor torque wind turbine, which is recommended, consists of a single blade turbine with a rotor (1) preferably located to leeward of the tower (8), as shown in FIG. 1, being alternatively also located to windward through appropriate variations to its structure, for example through a boomerang-shaped design.

Said rotor (1) is oscillating, cushioned by elastomers (10) located in the periphery of the fork (16) coupled to a slow speed shaft (3) which goes through a spindle (2) which holds a multiplier (5), a generator (6), and a brake disc (13), through a first bearing (4) that allows them to balance until compensating, in its angular motion, the torque and releasing the nacelle (9) from this stress.

The multiplier set (5), generator (6) and brake disc (13) form the pendulum or pendulum set (28).

The nacelle (9) formed by two halves in a lentil shape in which interior, the hydraulic components, control cabinets and gear motors (14) in charge of orientating the turbine in the start phase through engaging it with the inner ring of another gear bearing (7) flanged to the end of the tower (8), are housed.

From the nacelle (9) and forming part of itself, a crank arm (15) is placed, to which upper end the spindle (2) is attached and crossed by the low speed shaft (3) that aligns the rotor (1) with the pendulum set (28) through two bearings, one is the rotor bearing (18) and the other one is the bearing (4) that holds the pendulum (28).

In turn, the oscillating rotor (1) is formed by the blade (12) joined to the counterweight (18) through the hub (17) by means of flanges. Also, the hub (17) joins through its central part the mobile ring of the joint (19) which it crosses it through an exterior flange.

In a practical embodiment of the invention, a 28 m rotor (1) diameter turbine, in a single bladed execution, able to capture 200 Kw a 11 m/s when it rotates at 64.8 rpm with a torque of 2947 daNm, is given as an example.

From these data, (torque of 2947 daNm) the pendulum set is determined and dimensioned, which is going to compensate looking for the appropriate mass disposition (multiplier (5), generator (6), and brake disc (13)) so that, placed at a convenient distance (pendulum crank arm), the torque is balanced to a determined angle.

Below there is a table generated with weights and distances of the centers of gravity with regard to the pendulum shaft x=x for each component and thus, verify that for an arm of 1.4 m and an angle close to 55°, the turbine torque is balanced.

| Component | Mass Kg. | Dist. CG m. | Arm 55° | Moment of balance m*kg |
|---|---|---|---|---|
| Multiplier | 2,830.80 | 0.78 | 0.64 | 1,808.71 |
| Brake Disc casing | 70.00 | 1.46 | 1.20 | 83.72 |
| Brake disc | 106.55 | 1.40 | 1.15 | 122.20 |
| Generator | 1,300.00 | 1.40 | 1.15 | 1,490.86 |
| Total | 4,307.35 | | | 3,505.48 |

We can see that the moment of balance (3,505.48 mKg) is slightly higher than the torque (2,947 daNm) and therefore it will balance it for an angular motion lower than 55°.

In the following table we will verify that the moments of inertia with regard to the shaft of the rotating parts that form the pendulum set, go beyond 5.93 times the ones of the pendulum itself.

| Rotating parts | Mass Kg. | Moment of Inertia Kg*. m² | Relation to low speed shaft | Omega Rad./s | Reduction to low speed shaft I xx Kg. m² |
|---|---|---|---|---|---|
| Multip. Slow speed shaft | 279.20 | 14.89 | 1.00 | 6.59 | 14.89 |
| Multip. Intermediate shaft | 180.80 | 4.10 | 4.00 | 26.36 | 65.60 |
| Multip. countershaft | 204.00 | 6.76 | 4.00 | 26.36 | 108.16 |
| Multip. Fast speed shaft | 102.40 | 0.95 | 23.50 | 154.87 | 524.64 |
| Internal flywheel | 649.20 | 54.70 | 23.50 | 154.87 | 30,208.08 |
| Brake disc | 106.55 | 7.00 | 23.50 | 154.87 | 3,865.75 |
| Generator rotor | 300.00 | 3.60 | 23.50 | 154.87 | 1,988.10 |

TOTAL MASS ROTATING PARTS 1,822.15
MOMENT OF INERTIA REDUCED TO THE LOW SPEED SHAFT (Rotating parts of the pendulum) (A) 36,775.21
MOMENT OF INERTIA OF THE WIND TURBINE ROTOR 26,000.00
TOTAL MOMENT OF INERTIA OF THE POWER TRAIN ROTATING PARTS 62,775.21

| Pendulum | Mass Kg. | Axial moment of inertia Kg.* m² | Interaxial Distance to the low shaft m | Reduction to low speed shaft I xx Kg. m² |
|---|---|---|---|---|
| Multip. casing | 1,415.20 | 817.00 | 0.65 | 1,141.92 |
| Multip. Low speed shaft | 279.20 | 14.89 | 0.00 | 14.89 |
| Multip. Intermediate shaft | 180.00 | 4.10 | 0.50 | 49.30 |
| Multip countershaft | 204.00 | 6.76 | 1.00 | 210.76 |
| Multip. Fast speed shaft | 102.40 | 0.95 | 1.40 | 201.65 |
| Internal flywheel | 649.20 | 43.40 | 1.40 | 1,315.83 |
| Brake disc casing | 70.00 | 9.30 | 1.46 | 158.51 |
| Brake disc | 106.55 | 7.00 | 1.40 | 215.84 |
| Generator | 1,300.00 | 67.00 | 1.40 | 2,615.00 |

TOTAL PENDULUM MASS 4,307.35
MOMENT OF INERTIA OF THE PENDULUM WITH RESPECT TO THE LOW SPEED SHAFT (B) 6,196.71
A/B RATIO = 5.93

The obtained result guarantees that when facing a gust that causes a variation in the torque, the one with less inertia (pendulum) will react first without thus affecting the generator's rotor. This condition guarantees the generation of more uniform energy and therefore, of a better quality.

To clarify how the rotor (1) adapts the dihedron in function of the wind gusts, thus modifying its sweep area and cushioning the wind thrusts on the turbine, the equation that governs the dynamic equilibrium is shown, in which for a rotor at constant revolutions and turbine facing the wind the following applies:

Variation of the kinetic moment of the rotor (1) according to the w (moment of balance)=moment of thrust of the active part of the blade (12) (moment of unbalance).

$$HGw = \omega^2(I_{uz}(sen^2\theta - cos^2\theta) + (I_{uu} - I_{zz})sen\theta * cos\theta)$$

In turn $HGw = \Gamma_{th} \cos\theta *$trust (active zone)
Where, $\Gamma_{rh} \cos\theta *$trust$= \omega^2(I_{uz}(sen^2\theta - cos^2\theta) + (I_{uu} - I_{zz})sen\theta * cos\theta)$
Being:
u: normal shaft to oscillating blade shaft (w) and normal to the longitudinal shaft of the blade (z)
$\Gamma_{th}$: The trust arm
θ: Dihedron angle
ω: angular speed of the rotor (constant)
$I_{uz}$: the inertia product of plane u-z
$I_{uu}$: moment of inertia according to u shaft
$I_{zz}$: moment of inertia according to z shaft (shaft long. blade)
From this, the equilibrium angle of the dihedron can be determined, in function of the wind speed and its corresponding sweep area variation.

| $V_{m/s}$ | 5 | 6 | 7 | 8 | 9 |
|---|---|---|---|---|---|
| θ ° | 6.24 | 7.48 | 8.86 | 9.85 | 10.97 |
| %$_{area}$ | 98.8 | 98.0 | 97.6 | 97.0 | 96.2 |
| $V_{m/s}$ | 10 | 11 | 12 | 13 | 14 | 15 |
| θ ° | 12.04 | 13.04 | 13.96 | 14.79 | 15.53 | 16.16 |
| %$_{area}$ | 95.6 | 94.8 | 94.1 | 93.3 | 92.7 | 92.0 |

In the table above, we can see how the wind speed affects the dihedron variation and the sweep area and therefore its gust cushioning effect.

In summary, the invention recommends a compensated motor torque wind turbine that has the particularity of arranging the elements that form the power train, that is, the multiplier (5), the generator (6), and the brake disc (13) in a pendulum way, being suspended from the spindle (2) through a first bearing (4) aligned with the rotor (1) shaft (3) so that they can rotate, compensating, in its angular motion, the torque handled by the rotor (1) until balancing it avoiding said torque to be transferred to the nacelle (9), tower (8) and shoe, which stay uncharged.

This pendulum set accumulates potential energy when rising in its angular motion and it releases it when the gust stops and descends rotating in opposite direction of the turbine's rotor (1) rotation, restituting turns to the generator's rotor (6), being this effect a power regulator that will tend to uniform the amount of energy in the grid, smoothing the peaks and valleys through passive mechanical means.

If there is any perturbation in the torque, caused by a wind gust, this will affect the pendulum set (28) in the first place, which will automatically adapt to its new balance position, without affecting the rotation uniformity of the generator rotor (6) because the inertia of the rotating parts of the components that form the power train are higher than the inertia of the masses of the pendulum set itself (28) which will translate in generating more uniform and higher quality energy through passive mechanical means.

Besides, if there is any wind gust that modifies the shaft thrust on the rotor (1), this will adopt the dihedron angle of the blade (12) in its rotation movement, modifying its swept area, to the dihedron of about 155° in nominal conditions and being in dynamic balance, on the one hand, the stabilizing moment created by the dealignment of the blade (12) and counterweight (18) masses, and on the other hand, the destabilizing moment created by the resultant of the wind axial thrust. This adaptation of the swept area, proportionally inverse to the wind speed, is the first passive system of power peaks and valleys cushioning and thrusts on the turbine's structure.

To improve the rotation uniformity of the generator (6) rotor the turbine has a flywheel (11) located aligned with the shaft of the generator (6) that can be located both in the multiplier (5) or in its the exterior, acting as a brake disc (13) and in any case, always in the fast speed shaft (29).

In turn, the power transmission between the rotor (1) and the low speed shaft (3) is done by oscillating ties through forks (16) and joint (19). The oscillation of the joint is limited to ±10°, by means of a set of elastomers (10) to the oscillation shaft (w-w) of the rotor (1).

The fork (16) and joint (19) set allows transmitting the torque and the shaft thrust for each balance angle, providing the set with a degree of freedom that avoids the transmission of tilting moments derived from the difference in speeds of the wind, as the blade (12) goes at different ground heights in its rotation movement.

Figure 4:
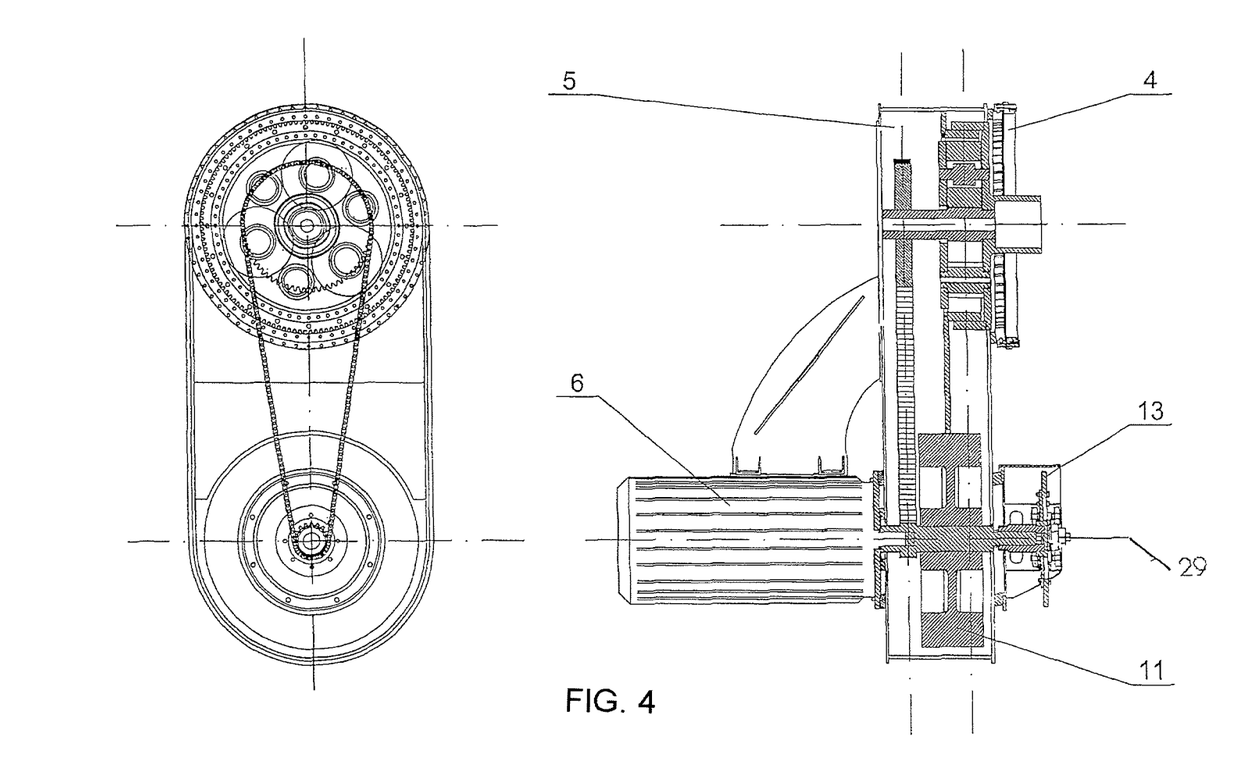
FIG. 4.—Shows schematic views, in lateral section, of the elements that form the pendulum set, in the case that this incorporates the generator, showing the configuration and disposition in detail.
Figure 5:
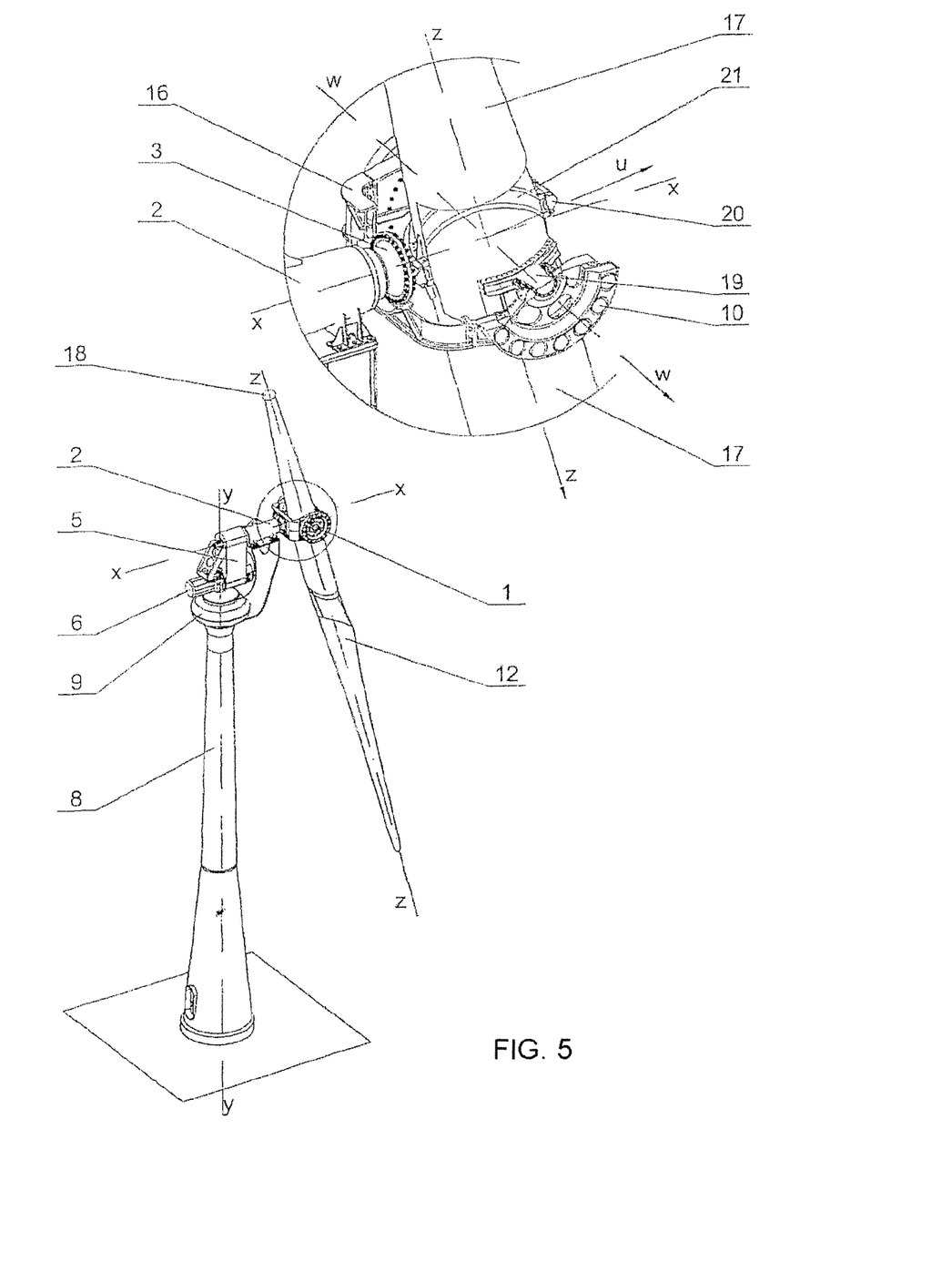
FIG. 5.—Shows a view in perspective of the pendulum wind turbine in a single bladed to leeward execution, as shown in FIG. 1, in which, in enlarged detail, the elements that constitute the rotor and the ones that integrate the propeller pitch, are shown.
Figure 6:
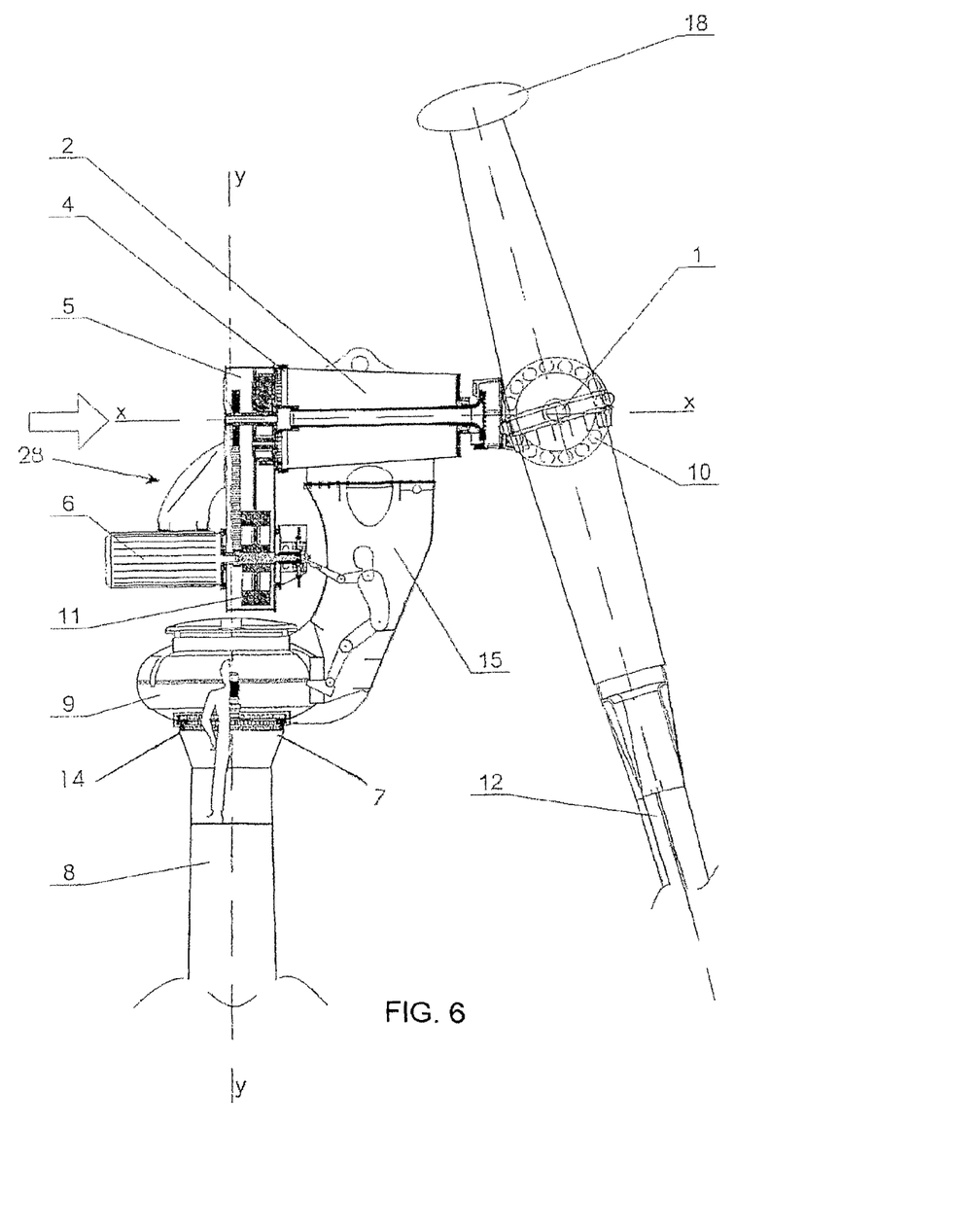
FIG. 6.—Shows an enlarged side view which shows the disposition of the pendulum assembly and the rotor assembly on the nacelle and tower.

It should be noted that to control the pass of the propeller there is a mechanism of crown and worm screw integrated in the joint (19), in which the crown constitutes the mobile ring (21) of a double ball bearing, carved in its central part, and the worm screw (20) is integrated in the exterior ring, fixed, of the bearing forming the joint (19) as shown in FIG. 4.

On the mobile ring (21) the hub (17) of the rotor (1) is flanged. This mechanism allows controlling the propeller passing to adjust the power captured by the turbine when being triggered by a hydraulic or electrical engine.

The hub (17) serves as a connection between the blade (12) and the counterweight (18). These three elements form the rotor (1).

It should also be noted that for the orientation with the machine stopped, the turbine of the invention provides for having a reversible execution geared motor brake (14), which engaged through a pinion, on the bearing inner ring (7) that holds the nacelle (9), governs the position of it until the machine connects to the grid. Once the machine is connected, the motor brake is unblocked releasing the set of the nacelle (9), as it is a self geared turbine. This gear motor-brake (14), is used to unwind, when necessary, the cables that form the loop inside the tower (8), or to position the nacelle (9) where desired, for example in maintenance operations.

Finally, it should be mentioned that the described system of compensated motor torque wind turbine in which the elements that form the power train (multiplier (5), generator (6), brake (13)) are suspended by means of a bearing (4), aligned with the rotor (1) shaft (3), so that they can balance, compensating in their angular motion the rotor (1) torque until balanced, and it is equally applicable to other single propelled motor machines such as, boats and aircrafts, in which the generator (5) is substituted by an engine and the chassis is substituted by a spindle.

Figure 2:
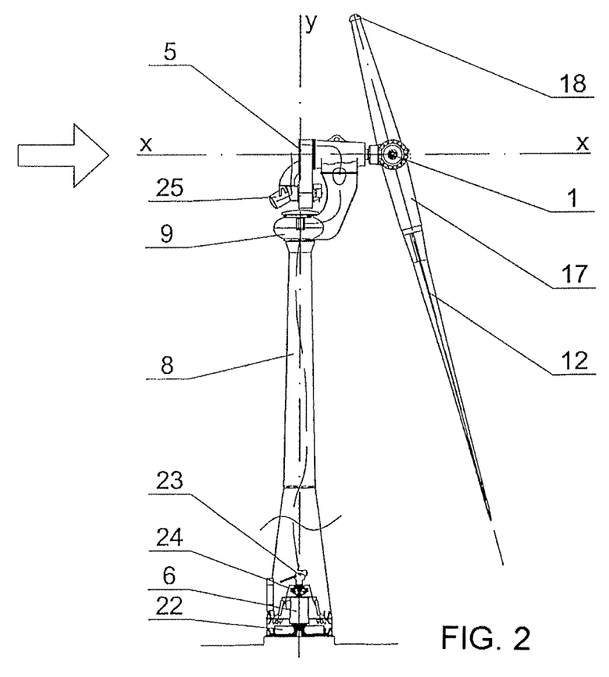
FIG. 2.—Shows a schematic side elevation view of a variant of embodiment of the turbine according to the invention, in an alternative example of execution with a hydrostatic transmission, generator, and large flywheel at the base of the tower.
Figure 3:
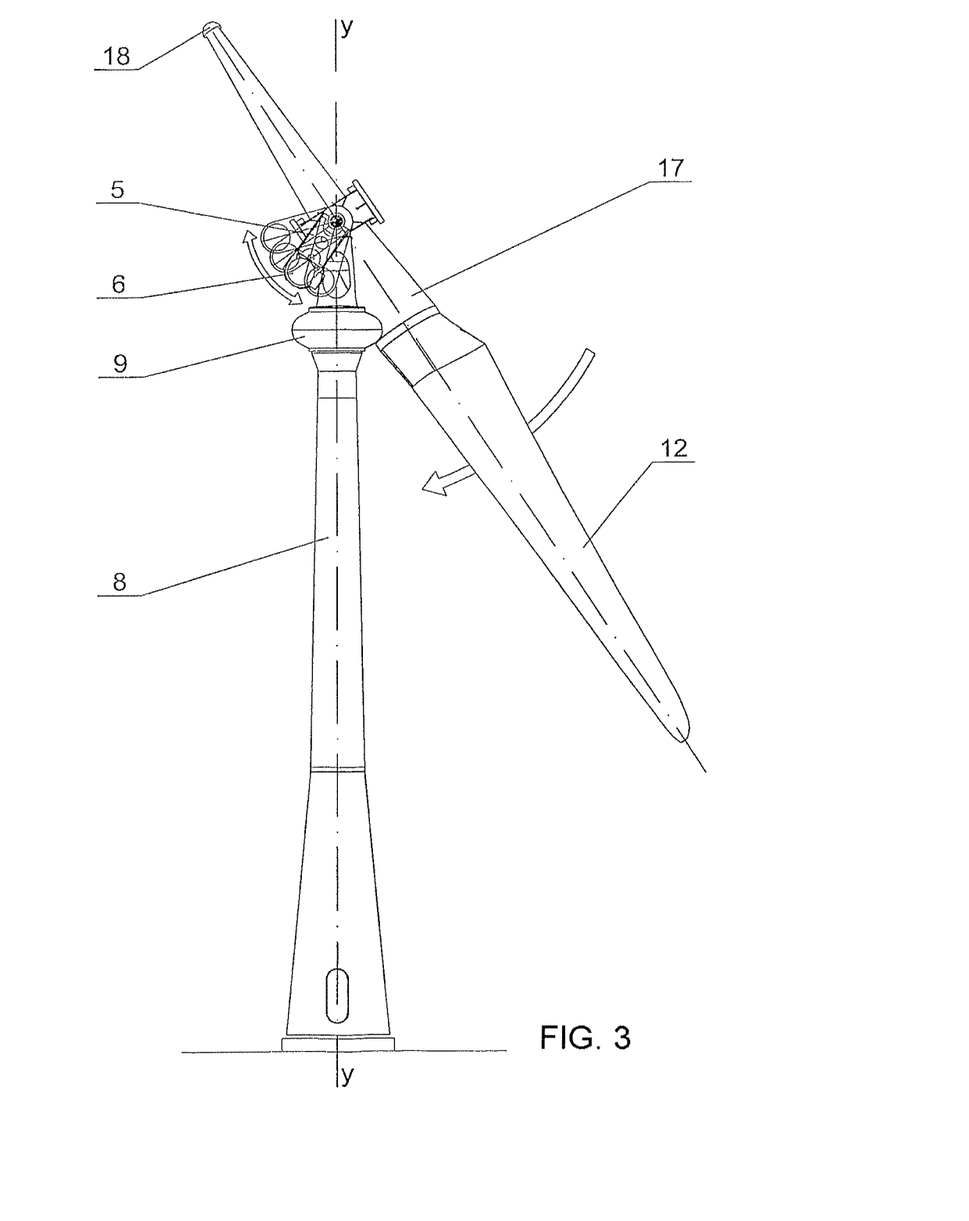
FIG. 3.—Shows a front elevation view of the turbine shown in FIG. 1, in operation, showing the direction of rotation and the compensating effect of the pendulum in detail.

In an alternative embodiment of the turbine with hydrostatic transmission, a oil hydraulic central (25) will be placed on the multiplier (5), where the generator (6) was previously placed, the central (25) being part, along with the multiplier (5), of the pendulum set (28) in place of the generator (6) that is located at the base of the tower.

Figure 7:
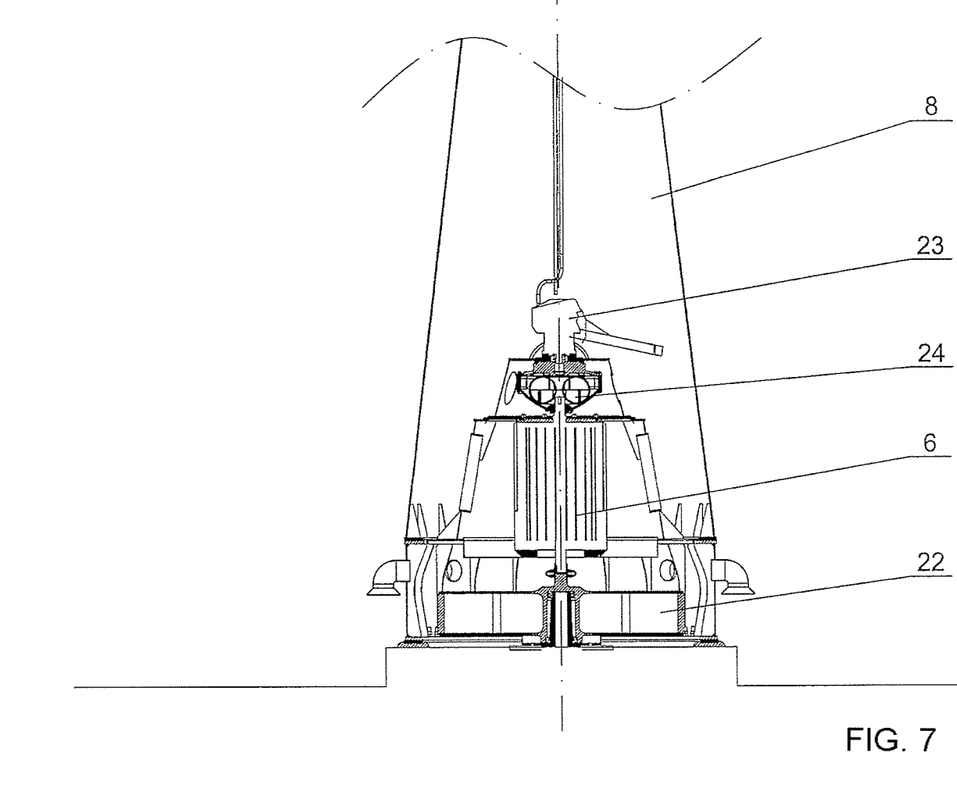
FIG. 7.—Shows an enlarged side view in which the disposition of the stabilization kit at the base of the tower is shown.

In turn, the generator (6) will be placed at the foot of the tower (8), where it will be part of the stabilization kit composed by a second flywheel (22) attached to the generator (6) passing shaft, being both activated through a oil hydraulic servomotor (23) of variable cylinder, through a hydraulic coupler (24).

This stabilizing kit, will be optional and will be flanged between the shoe's base and the base of the tower (8), both bases with flanges of the same size, providing more height to the rotor (1) shaft.

Figure 8:
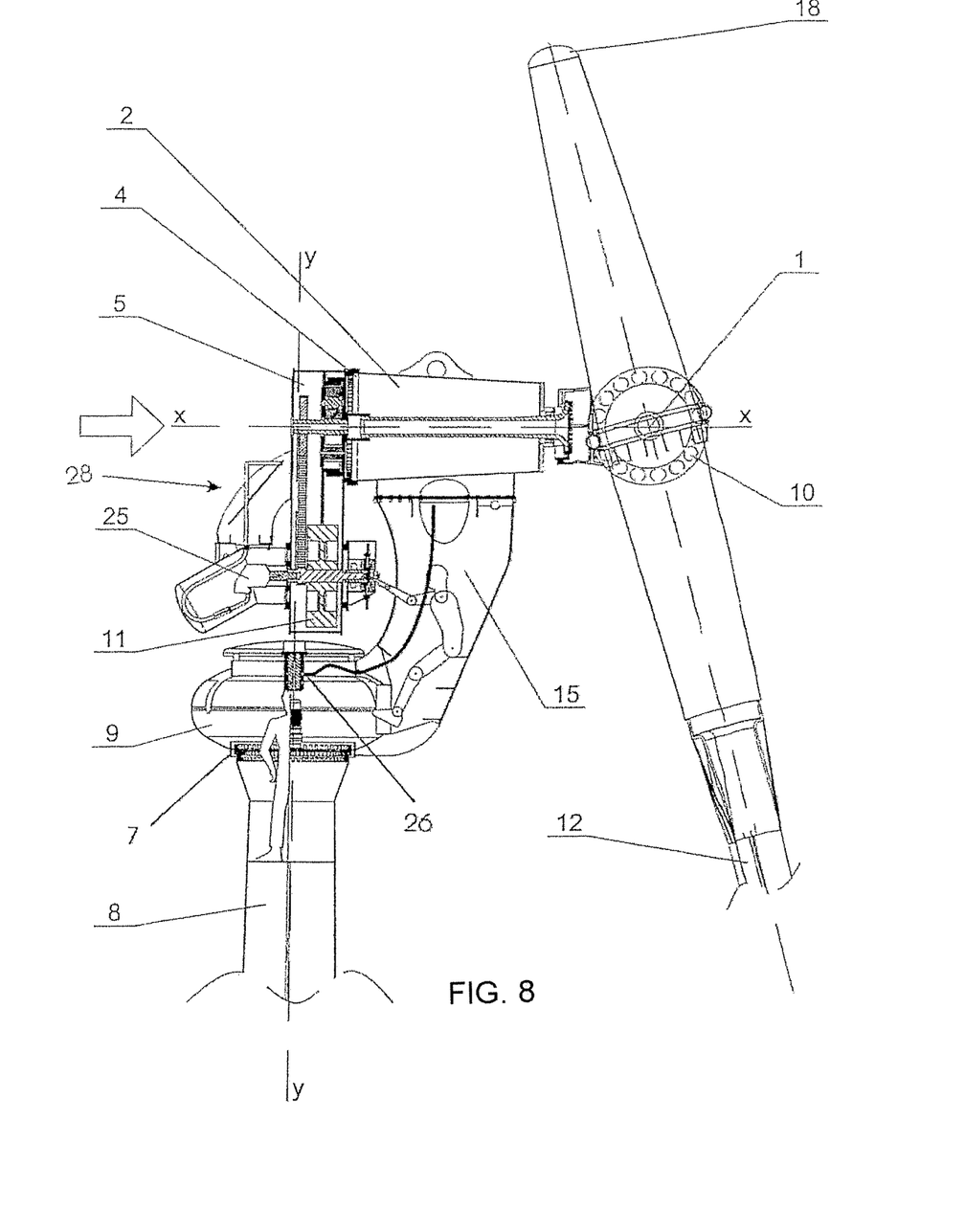
FIG. 8.—Shows an enlarged side view in which the pendulum set with the oil hydraulic central and the conducts to the rotating fitting, located in the nacelle, are shown.

In this embodiment the mechanical power at the exit of the multiplier (5) will be transformed in oil hydraulic power in the form of volume x oil pressure, in the pump located in the oil hydraulic central (25) transmitted to the oil hydraulic servomotor (23) through pressure conducts, that going through a rotating connector (26), located in the nacelle (9), will form a closed circuit.

The flexibility provided by the cylinder variation of the servomotor (23) will allow maintaining almost constant revolutions in the generator (6)+flywheel (22) set, regardless of the rotor (1) revolutions, which will work at constant λ (lambda), improving the rotor's performance.

This application will be of interest when generating energy in a more uniform way, especially in isolated applications or when the generator (6) is connected to weak grids.

Figure 9:
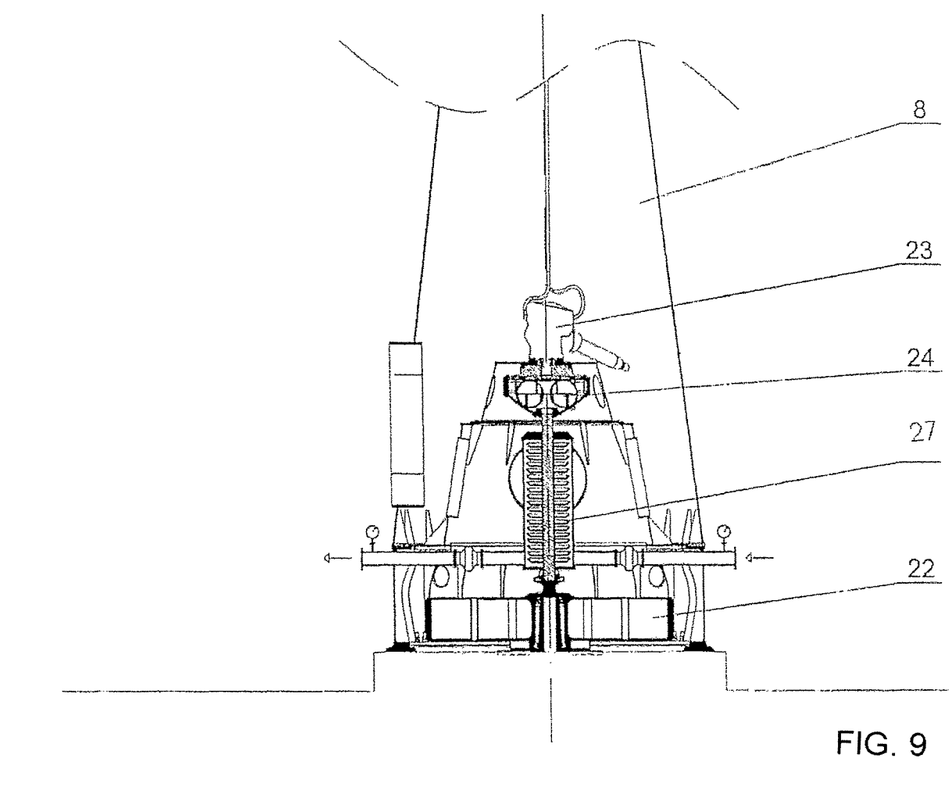
FIG. 9.—Shows an enlarged side view in which the disposition of the stabilization kit, in its version for a pumping application, at the base of the tower, is shown.

If the application was eolic pumping or inverse osmosis desalination, in this stabilization kit the generator (6) will be substituted by a pump (27) which, attached to the second flywheel (22) will be activated by the servomotor (23) through hydraulic coupler (24).

Besides, in the case of well pumping, the pump (27) would go submerged in depth and its shaft operated through the flywheel (22), by cardan transmission.

We would like to highlight that the design of the multiplier (5) is vital to achieve the objective of torque compensation, and of cushioning, storing and energy transmission.

To achieve the first objective, the torque compensation, a multiplier (5) with spaced parallel shafts will be designed, which will allow increasing the lever arm, so that the compensating masses (generator (6)+flywheel (11)) are not excessive.

To achieve the second objective (cushioning, storing and energy transmission) it will be sought that the inertias of the rotating parts exceed the inertia of the pendulum set itself, that is why a flywheel (11) is placed in the fast speed shaft (29) (further) that besides acting as a counterweight, it increases the inertias of the rotating parts, so that if there is a disturbance in the torque, this affects as little as possible the rotating uniformity of the generator rotor.

Thus, this multiplier (5) (see FIG. 4) held from a concentric bearing with the motor shaft that allows it to balance, compensating in its angular motion said torque, is designed with two multiplying stages, the first one formed by a multiplier with an epicyclical design of three or more satellites, suitable to support the high entry torques and a second stage formed by a chain transmission, suitable to separate the distance between shafts.

On the fast speed shaft (29) and inside the multiplier itself (5), said flywheel (11) will be placed, that besides acting as a counterweight, it will uniform the turning speed of it and therefore the speed of the generator shaft to which is attached directly. On the other end of the fast speed shaft (29) the brake disc (13) is located.

Having the nature of the present invention been sufficiently described, as well as the way to put it into practice, it is not necessary to make its explanation more extensive, so that any person skilled in the art can understand its scope and the advantages derived from it, stating that, within its essentiality, it can be put into practice in other embodiments that differ in detail from the one indicated as way of example, and to which the protection claimed will also be effective as long as its fundamental principle is not altered, changed or modified.

The invention claimed is:

1. Wind turbine with compensated motor torque including a single bladed rotor (1) having a single blade (12) attached to a rotor shaft (3) that goes through a spindle (2) held from a nacelle (9), arranged on a gear bearing (7) placed on the top of a tower (8), attached by means of a corresponding shoe, characterized in that the wind turbine has the elements that form a power train, that is, a multiplier (5), a generator (6), and a brake disc (13) suspended from the nacelle (9) through a first bearing (4) aligned with the rotor (1) shaft (3) together forming a pendulum set (28), said first bearing (4) allowing the pendulum set to rotate, compensating, in angular motion of the pendulum set a torque of the rotor (1) until balancing the torque of the rotor (1) avoiding said torque to be transferred to the nacelle (9), the tower (8) and the shoe; in that said pendulum set (28) accumulates potential energy when rising in angular motion and moving in a first direction and releasing potential energy when the pendulum set (28) descends in angular motion rotating in a second direction opposite said first direction and of the turbine's rotor (1) rotation, restituting turns to the generator's rotor (6), being this effect a power regulator that will tend to uniform the amount of energy in the grid, smoothing the peaks and valleys through passive mechanical means.

2. The wind turbine with compensated motor according to claim 1, characterized in that the structure and configuration of the pendulum set (28) is configured to insure that the inertia of the rotating parts of the components that form the power train are higher than the inertia of the mass of the pendulum set itself (28).

3. The wind turbine with compensated motor according to claim 1, characterized in that the multiplier (5) is made of parallel shafts of extra long execution, formed by two or more multiplying stages including at least one slow stage and one fast stage, wherein the slow stage is of epicyclical design with three or more satellites, suited to transmit the torque and wherein the fast stage includes a high speed shaft (29) and a chain transmission suited to achieve the extra long execution and because on said high speed shaft (29) there is a first flywheel (11) which gives speed stability and increases the inertia of the rotating parts, so that in the event of a disturbance of the torque, this affects the pendulum set (28) without perturbing the speed uniformity of the generator (6) shaft.

4. The wind turbine with compensated motor according to claim 1, characterized in that the rotor (1) is a single bladed oscillating rotor cushioned by elastomers (10), placed between a fork (16) and a joint (19), with dihedron of 155' in nominal conditions when being in dynamic balance, on the one hand, the stabilizing moment created by the dealignment of the blade (12) and a counterweight (18) masses, and on the other hand, the destabilizing moment created by the resultant of the wind axial thrust.

5. The wind turbine with compensated motor according to claim 1, characterized in that to control the pass of a propeller, there is a mechanism of a crown and a worm screw integrated in a joint (19), in which the crown constitutes the mobile ring (21) of a double ball bearing, carved in its central part, and the worm screw (20) is integrated in the exterior ring, fixed, of a bearing forming the joint (19); and wherein on a mobile ring (21), a hub (17) of the rotor (1) is flanged.

6. The wind turbine with compensated motor according to claim 1, characterized in that the nacelle (9) is of an elliptical section formed by two halves welded in a lentil shape forming an interior in which interior, hydraulic components, control cabinets and gear motors are housed; and from the nacelle (9) and forming part of itself, a crank arm (15), that holds the spindle (2), the rotor (1) and the pendulum set (28), is placed to leeward.

7. The wind turbine with compensated motor according to claim 1, characterized in that the arrangement of the elements that form the power train (multiplier (5), generator (6) and flywheel (11)) are suspended from the nacelle (9) through a bearing (4) aligned with the rotor (1) shaft (3) so that they can balance, compensating, in angular motion, the rotor (1) until balancing it, is applicable to other single propeller motor machines such as ships or aircrafts, wherein the generator (6) is substituted by an engine of said other single propeller motor machines.

8. The wind turbine with compensated motor according to claim 1, characterized in that in an embodiment with a greater uniformity and quality in the energy supply, a hydrostatic transmission is inserted between the multiplier (5) and the generator (6), so that the generator (6) in a through shaft version, is located attached to a second flywheel (22) both located at the base of the tower (8), being activated by an oil hydraulic servomotor (23) of variable cylinder through a hydraulic coupler (24); said generator (6) attached to said second flywheel (22) forming a stabilization kit; and on the multiplier (5) an oil hydraulic central (25) is mounted forming part of the pendulum set (28) in place of the generator (6) which is placed at the base of the tower.

9. The wind turbine with compensated motor according to claim 8 characterized in that when applied to eolic pumping or inverse osmosis desalination, inside the stabilization kit, the generator (6) will be substituted by a through shaft pump (27) which provides a more stable energized flow; and because in case of well pumping, the through shaft pump (27) would be submerged in depth and its shaft operated through a cardan transmission from the second flywheel (22).

\* \* \* \* \*